US012758805B2

(12) United States Patent
Moran et al.

(10) Patent No.: US 12,758,805 B2
(45) Date of Patent: Oct. 13, 2026

(54) CLOSED-CIRCUIT COMBINED UNIT RESPIRATOR SYSTEM

(71) Applicant: Mine Survival, Inc., Panama City Beach, FL (US)

(72) Inventors: Robert N. Moran, Panama City Beach, FL (US); Francisco Elias Hernandez, Lynnhaven, FL (US); David E. Cowgill, Panama City Beach, FL (US)

(73) Assignee: Mine Survival, Inc., Panama City Beach, FL (US)

( * ) Notice: Subject to any disclaimer, the term of this patent is extended or adjusted under 35 U.S.C. 154(b) by 618 days.

(21) Appl. No.: 18/268,298

(22) PCT Filed: Dec. 20, 2021

(86) PCT No.: PCT/US2021/064440

§ 371 (c)(1),
(2) Date: Jun. 19, 2023

(87) PCT Pub. No.: WO2022/133355

PCT Pub. Date: Jun. 23, 2022

(65) Prior Publication Data

US 2024/0066329 A1 Feb. 29, 2024

Related U.S. Application Data

(60) Provisional application No. 63/128,098, filed on Dec. 19, 2020.

(51) Int. Cl.
*A62B 7/02* (2006.01)
*A62B 7/10* (2006.01)
(Continued)

(52) U.S. Cl.
CPC .................. *A62B 7/02* (2013.01); *A62B 7/10* (2013.01); *A62B 9/00* (2013.01); *A62B 9/003* (2013.01);
(Continued)

(58) Field of Classification Search
CPC .... A62B 7/02; A62B 7/10; A62B 9/00; A62B 9/003; A62B 9/02; A62B 7/08;
(Continued)

(56) References Cited

U.S. PATENT DOCUMENTS

2018/0036562 A1* 2/2018 Patel ........................ A62B 7/10
2019/0358472 A1* 11/2019 Gauthier .................. A62B 7/02
2020/0023149 A1* 1/2020 Telby .................... A61M 16/22

FOREIGN PATENT DOCUMENTS

CN 203802973 U * 9/2014
CN 111420313 A * 7/2020 ............... A62B 7/10
(Continued)

OTHER PUBLICATIONS

CN111420313A Description Machine Translation accessed Nov. 29, 2025 (Year: 2025).*
(Continued)

*Primary Examiner* — Elliot S Ruddie
(74) *Attorney, Agent, or Firm* — Stevens & Lee, P.C.

(57) ABSTRACT

A method and system for closed-circuit combined unit respiration, is disclosed. More specifically, an enriched air, multi-use closed-circuit self-contained breathing apparatus for on-demand transition between a powered air purifying respirator (PAPR) mode and a closed-circuit rebreather mode, is disclosed. The system may comprise a carbon dioxide scrubbing canister configured to receive an exhaled gas and scrub carbon dioxide from the exhaled gas when in a closed-circuit mode. A breathing bag may receive the scrubbed gas when in the closed-circuit mode. The scrubbed
(Continued)

gas may be infused with oxygen, resulting in an enriched gas when in the closed-circuit mode. A cooler comprising a plurality of heatsink fins may cool the enriched gas and a breathing hose may transmit the enriched gas for inhalation when in the closed-circuit mode. The system may further comprise a PAPR to intake and filter external air for inhalation when in the PAPR mode.

20 Claims, 13 Drawing Sheets

(51) Int. Cl.
*A62B 9/00* (2006.01)
*A62B 9/02* (2006.01)
*B01D 53/04* (2006.01)

(52) U.S. Cl.
CPC ............ *A62B 9/02* (2013.01); *B01D 53/0415* (2013.01); *B01D 2257/504* (2013.01); *B01D 2259/4533* (2013.01)

(58) Field of Classification Search
CPC . A62B 19/00–02; A62B 9/022; A62B 23/025; A62B 23/00; A62B 18/086; A62B 18/025; A62B 18/08; A62B 7/04; A62B 18/02; A62B 18/10; A62B 7/00; B01D 53/0415; B01D 2257/504; B01D 2259/4533; A61M 16/22
See application file for complete search history.

(56) References Cited

FOREIGN PATENT DOCUMENTS

| | | | |
|---|---|---|---|
| GB | 447119 | A | 5/1936 |
| GB | 733473 | A | 7/1955 |
| GB | 2264870 | A | 9/1993 |
| KR | 20080073270 | A | 8/2008 |
| KR | 102081642 | B1 | 2/2020 |

OTHER PUBLICATIONS

CN203802973U Machine Translation Description accessed Nov. 29, 2025 (Year: 2025).*
Patent Cooperation Treaty; Written Opinion and International Search Report, Mar. 21, 2022, cited in Application No. PCT/US21/64440, 9 pages.

* cited by examiner

CLOSED-CIRCUIT COMBINED UNIT RESPIRATOR SYSTEM

CROSS-REFERENCE TO RELATED APPLICATIONS

This application is a national stage entry from and claims the benefit of International Patent Application No. PCT/US21/64440, filed Dec. 20, 2021, which claims the benefit of U.S. Provisional Patent Application Ser. No. 63/128,098, filed Dec. 19, 2020, the entireties of which are herein incorporated by reference.

TECHNICAL FIELD

This application relates to a closed-circuit combined unit respirator system. More specifically, the application relates to an enriched air, multi-use closed-circuit self-contained breathing apparatus (CC-SCBA) for on-demand transition between powered air purifying respirator (PAPR) and closed-circuit rebreather.

BACKGROUND

Solutions are needed to incorporate powered air purifying respirator (PAPR) technologies into closed-circuit, self-contained breathing apparatus (CC-SCBA) systems while reducing the size, weight, power, and logistical requirements over existing CC-SCBA technologies. CC-SCBAs and PAPRs are utilized in a variety of military, first response, industrial, pharmaceutical, and other applications for respiratory protection when highest levels of contamination are present, suspected, and/or the environments encountered may be oxygen deficient.

The current CC-SCBAs that are in-use are oxygen rebreathers. The oxygen rebreather is the simplest kind of rebreathing system and improvements to the present rebreathing systems are needed.

SUMMARY

According to embodiments of the present disclosure, a system providing PAPR and closed-circuit SCBA capabilities in one combined unit. This device will be able to be rapidly deployed in a variety of missions, providing an increase in capability and a decrease in logistical burden. Embodiments of the present disclosure represent a significant advantage over current PAPRs, SCBAs and CC-SCBAs and will expand the capabilities and versatility of the current and future military force.

The objective of the present disclosure is to provide an enriched air, multi-use device that allows the user to transition between PAPR and closed-circuit rebreather "at-will". The significant operational flexibility brought about by the modest improvement in size, weight, and power consumption (SWaP) enables extended time on target and a more efficient breathing experience for the operator. Embodiments of the present disclosure provide a CC-SCBA with PAPR that can minimize logistical burden while at the same time providing a measurable increase in capability and maintaining the same broad mission applicability.

According to embodiments of the present disclosure, a system for closed-circuit combined respiration, includes, when operating in a closed-circuit mode, a carbon dioxide scrubbing canister configured to receive exhaled gas and scrub carbon dioxide from the exhaled gas when in a closed-circuit mode; a breathing bag configured for receiving the scrubbed gas; an oxygen bottle, valve and regulator configured for infusing the exhaled gas or scrubbed gas with oxygen resulting in enriched gas; a cooler comprising a plurality of heatsink fins for cooling the enriched gas; and a breathing hose configured for transmitting the enriched gas for inhalation. In some embodiments, the system includes a diluent bottle, valve and regulator for infusing the exhaled gas, the scrubbed gas or the enriched gas with diluent.

In some embodiments, when operating in a PAPR mode, the system includes a tube configured for receiving exhaled gas and bypassing the canister; an over-pressure valve (OPV) configured for expelling exhaled gas to interior of case, thereby creating positive pressure; a PAPR for intake and filtering of external air while a barrel valve is open, thereby allowing the external air to flow into the breathing bag; and wherein the cooler is configured to receive the PAPR air from the breathing bag and transmit the PAPR air to the breathing hose for inhalation.

In some embodiments, when operating in a closed-circuit mode, the system includes a PAPR cooling tube configured for transmitting PAPR air to the cooler for cooling the heatsink fins. In some such embodiments, a carbon dioxide bottle and controller configured for infusing the PAPR air with carbon dioxide for cooling the heatsink fins.

According to embodiments of the present disclosure, a system for closed-circuit combined respiration, comprises a case for housing a breathing bag; when operating in a closed-circuit mode: a carbon dioxide scrubbing canister configured to receive exhaled gas and scrub carbon dioxide from the exhaled gas when in a closed-circuit mode; wherein the breathing bag is configured for receiving the scrubbed gas; an oxygen bottle, oxygen bottle valve and oxygen bottle regulator configured for infusing the exhaled gas or scrubbed gas with oxygen resulting in enriched gas; a cooler comprising a plurality of heatsink fins for cooling the enriched gas; a breathing hose configured for transmitting the enriched gas for inhalation; and when operating in a PAPR mode: a tube configured for receiving exhaled gas and bypassing the canister; an over-pressure valve (OPV) configured for expelling exhaled gas to an interior of the case, thereby creating positive pressure within the case; a PAPR for intake and filtering of external air while a barrel valve is open, thereby allowing the external air to flow into the breathing bag; and wherein the cooler is configured to receive the PAPR air from the breathing bag and transmit the PAPR air to the breathing hose for inhalation.

In some embodiments, the system also includes a diluent bottle, valve and regulator for infusing the exhaled gas, the scrubbed gas or the enriched gas with diluent.

In some embodiments, the system also includes, when operating in a closed-circuit mode, a PAPR cooling tube configured for transmitting PAPR air to the cooler for cooling the heatsink fins.

In some such embodiments, the system also includes a carbon dioxide bottle and controller configured for infusing the PAPR air with carbon dioxide for cooling the heatsink fins.

DETAILED DESCRIPTION

Figure 2:
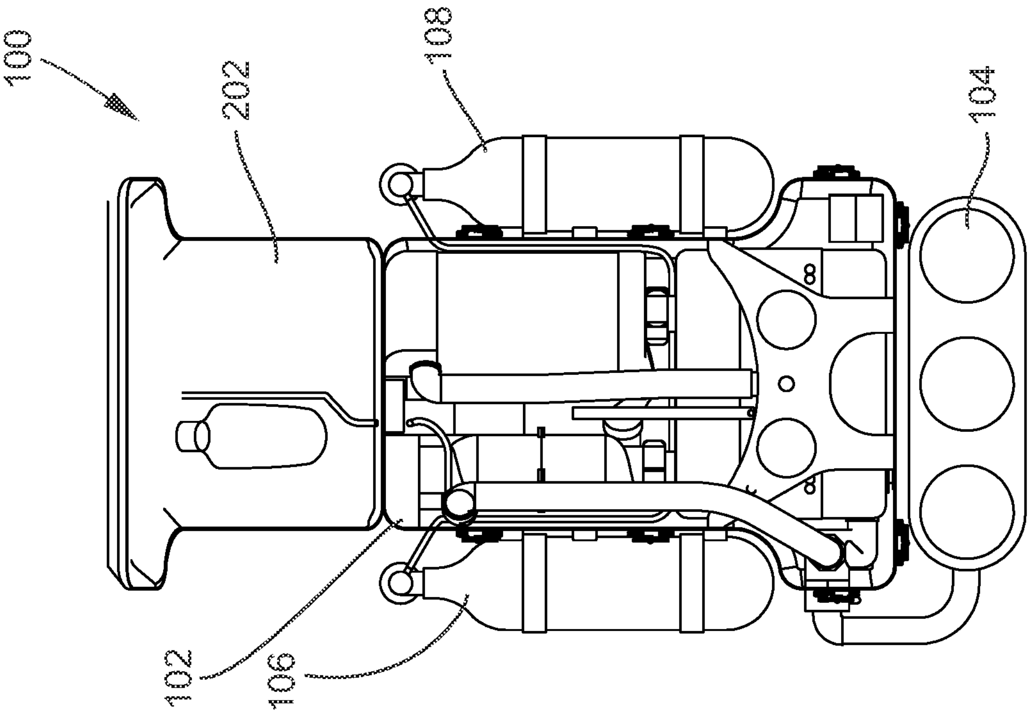
FIG. 2 illustrates the system of FIG. 1 in an open configuration.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Referring now to the drawings and the listing of machine components set out below, the present disclosure according to a preferred embodiment is described in further detail.

The oxygen rebreather forms the starting point for creation of embodiments of the present disclosure described in this application. Namely, embodiments provide an efficiently designed closed-circuit combined unit respirator system (CCCURS). An oxygen rebreather consists of basic components—scrubber, breathing bag, demand regulator, breathing hoses, and a cylinder of pure oxygen as the supply gas to replace oxygen consumed by the wearer. Some types of oxygen rebreathers add oxygen into the breathing loop in an on-demand basis, enabling the longest duration by saving the available oxygen until it is required by the operator's metabolism. Other types of rebreathers utilize a combination of constant flow and on-demand regulators to maintain positive pressure inside of the breathing loop.

Drawbacks of the oxygen rebreather include pulmonary oxygen toxicity, high inhalation breathing temperatures and humidity, facepiece fogging, time-consuming procedures for packing of the carbon dioxide absorbent, and the logistic support for the making of and refreezing of water into ice that is used for cooling in the breathing loop.

After approximately twelve (12) hours, high partial pressure Oxygen (PPO2) exposure leads to lung passageway congestion, pulmonary edema, and atelectasis caused by damage to the linings of the bronchi and alveoli. The formation of fluid in the lungs causes a feeling of shortness of breath combined with a burning of the throat and chest, as well as very painful breathing. The reason for this effect in the lungs but not in other tissues is that the air spaces of the lungs are directly exposed to the high O2 pressure caused by multiple days of 100% oxygen rebreather operations.

Embodiments of the present disclosure provide a closed-circuit, enriched-air rebreather with an attached powered air purification system. The modular design allows one (1) hour, two (2) hour, three (3) hour and four (4) hour closed-circuit configurations. Each configuration has a corresponding scrubber canister and bottle size, reducing unit weight and matching it to mission duration. Combining PAPR and CC-SCBA technology allows the operator to extend his time on target by multiple orders of magnitude. Other design features result in reduced size, weight, power and logistical requirements over existing CC-SCBAs as summarized herein.

Incorporating a PAPR into the closed-circuit apparatus, the operating radius is exponentially larger than prior machines. Using the PAPR during dress-out and decontamination (1 hour each), there are six (6) hours of remaining battery life and up to four (4) hours of re-breather still to use.

Pack weight is an important component to movement during a close quarter operation. Carrying a breathing system that weighs twenty-five point five (25.5) lbs for thirty (30) minutes of breathing time is the equivalent of carrying one pound for one point one-seven (1.17) minutes of breathing air. With a weight of less than twenty-seven (27) lbs in certain embodiments, the four (4) hours of closed-circuit breathing, the embodiments disclosed herein provide almost nine (9) minutes (testing indicates 8.88 minutes) for every pound of equipment weight, providing for a more efficient breathing experience for the operator.

Operator endurance is significantly impacted by use of embodiments of the present disclosure having an inhalation gas cooling system. The operator's breathing gas is cooled by re-purposing the existing PAPR air flow over heat exchangers—reducing both heat and moisture.

Researchers discovered high exhalation pressures will create build-up of CO2 in the body. Embodiments of the present disclosure have unique breathing pathways to reduce exhalation to below two-hundred (200) mm H2O and greater than zero (0) mm H2O peak inhalation pressure, keeping positive pressure in the operator's breathing loop and reducing CO2 build-up in the body.

However, the operation is not over until the gear has been decontaminated—embodiments of the present disclosure are configured to ease the burden of decontamination by repurposing the filtered PAPR gas into the case—creating a positive case pressure.

Keeping the O2 partial pressure range between (0.195) and (0.235) greatly reduces the risk of pulmonary O2 toxicity. Keeping the O2 percentage to twenty-three point five percent (23.5%) gives the operator freedom to switch between PAPR and rebreather at-will.

Incorporation of a powered fan or blower mode into the respirator system enables the CC-SCBA capacity to remain as high as possible until the time period just prior to entry into the "hot zone" or target area. Use of PAPR mode during dress out and mission traverse will also reduce the impact of thermal and other physiological burdens during total mission performance.

Closed-circuit self-contained breathing apparatus (CC-SCBA) and powered air purifying respirators (PAPRs) are essential personal protective equipment (PPE) items used by a variety of military, first response, industrial, pharmaceutical, and other personnel for respiratory protection when contamination is present, suspected, and/or the environments encountered may be oxygen deficient.

Current CC-SCBA technologies are used in a variety of mission sets, but often bring a heavy burden to the user from the thermal and physiological effects of wearing heavy protective equipment while encapsulated within high level protection garments. Additionally, the user's reporting unit faces substantial logistical burden to support use of CC-SCBA equipment due to ice cooling required in the breathing loop, on-hand supply for multiple systems required during one mission, and utilization of system consumables such as carbon dioxide sorbents and oxygen cylinders.

In nearly all man-mounted applications of CC-SCBA, carbon dioxide is removed from the closed breathing loop through use of sorbent materials that, while efficient in CO2 removal, tend to be highly exothermic in nature (causing high temperature air to be inhaled) which lends itself to human exhaustion during use. Additionally, use of the closed loop system makes it necessary to begin to utilize the consumable sorbent immediately upon facepiece or mask donning by virtue of the user breathing. As such, critical system consumables are being utilized while the subject is still continuing to dress out in the remainder of protective equipment, conduct all pre-mission checks, traverse areas from the command post to the target area, and while returning from the "hot zone" to the decontamination line.

The duration of these activities leads to shortening total mission duration as a function of oxygen and carbon dioxide scrubbing capability. Incorporation of a powered fan or blower mode into the respirator system enables the CC-SCBA capacity to remain as high as possible until the time period just prior to entry into the "hot zone" or target area. Use of PAPR mode during dress out and mission traverse will also reduce the impact of thermal and other physiological burdens during total mission performance.

The current CC-SCBAs that are in-use are oxygen rebreathers. The oxygen rebreather is the simplest kind of rebreathing system and forms the starting point for investigation of a more efficiently designed closed-circuit combined unit respirator system (CC-CURS) as described herein. An oxygen rebreather consists of basic components—scrubber, breathing bag, demand regulator, breathing hoses, and a cylinder of pure oxygen as the supply gas to replace oxygen consumed by the wearer. Some types of oxygen rebreathers add oxygen into the breathing loop in an on-demand basis, enabling the longest duration by saving the available oxygen until it is required by the operator's metabolism. Other types of rebreathers utilize a combination of constant flow and demand regulators to maintain positive pressure inside of the breathing loop.

Incorporating a PAPR into the closed-circuit apparatus, the operating radius is exponentially larger. Using the PAPR during dress-out and decontamination (1 hour each), there are 6 hours of remaining battery life and up to 4 hours of re-breather still to use.

Figure 1:
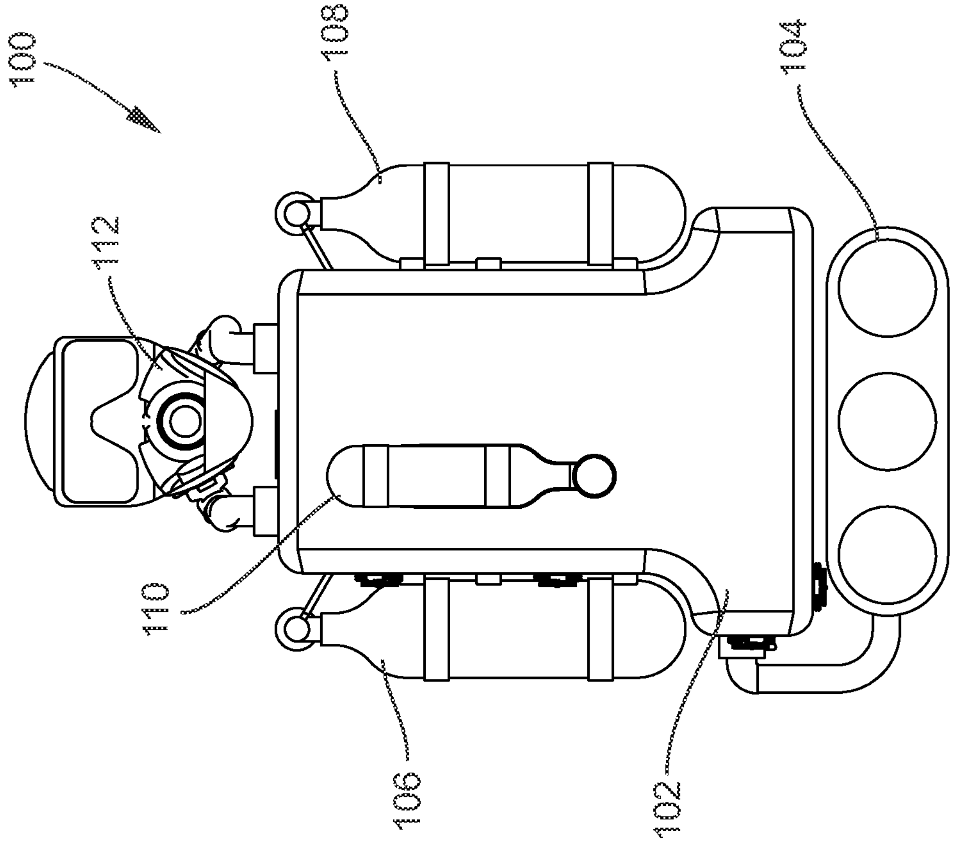
FIG. 1 illustrates a closed-circuit combined unit respirator system according to embodiments of the present disclosure.

Referring to FIG. 1, a rear view of a closed-circuit combined unit respirator (CCCUR) system 100 according to embodiments of the present disclosure is shown. Many of the components of the system 100 are enclosed in a case 102, which is coupled with a PAPR 104. The system 100 has a diluent bottle 106, an oxygen bottle 108, and a carbon dioxide bottle 110 and a facepiece or mask 112.

FIG. 2 is a rear view of the system 100 with a lid 202 of the case 102 open to reveal internal components of the system 100.

Figure 3:
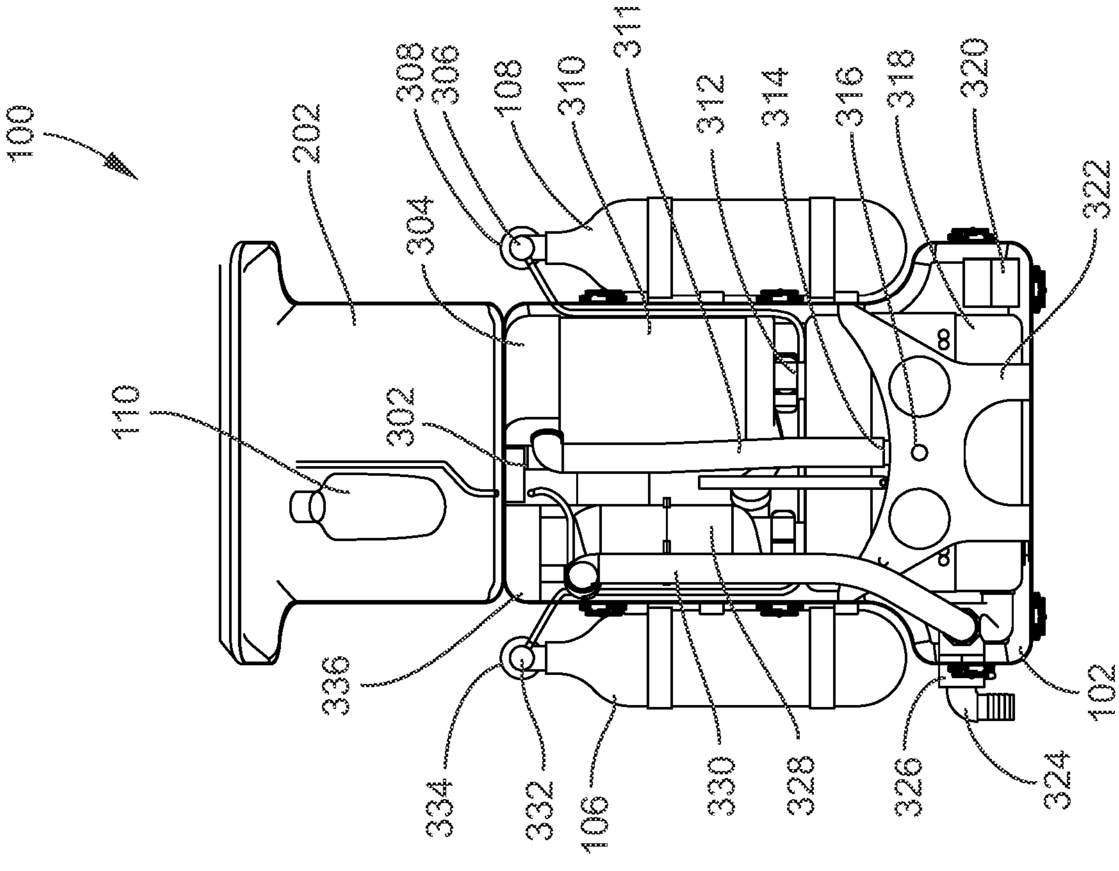
FIG. 3 illustrates the system of FIG. 1 in an open configuration with some components not shown.

FIG. 3 is also a rear view of the system 100 with the lid 202 open and some components not shown for illustrative purposes. Moving around the case 102 clockwise generally from the twelve o'clock position, the case 102 includes a case pressure relief 302 near its top. When activated, the case pressure relief 302 releases pressure, whether positive or negative inside the case, or in other words it breaks seal of the case with the environment external to the case so that the internal case pressure remains constant. The system 100 has an oxygen sensor and a check valve housed in an oxygen sensor housing 304. The diluent bottle 108 is connected to the rest of the system 100 via diluent bottle valve 306, which is controlled by diluent bottle regulator 308. A canister 310 is contained in the case 102. The canister 310 contains carbon dioxide scrubbing materials to remove carbon dioxide from exhaled gas. Disposed near the canister 310 is an over-pressurization valve or OPV tube 311, which is coupled with an overpressure exhaust valve 314 coupled with the OPV 316. A check valve 312 is coupled with the canister 310 and the breathing bag 318. The system battery pack 320 is disposed in the lower right-hand corner of the case 102. A breathing bag stability assembly 322 stabilizes the breathing bag 318 within the case 102.

On the lower left-hand corner of the case 102, a PAPR inlet 324 is configured to couple with the PAPR 104 (shown in other figures). A barrel valve 326 is coupled with the PAPR inlet 324 and regulates PAPR gas flow into the case 102. A cooler 328 includes a number of fins or other heat transfer structure in order to facilitate cooling of gas after carbon dioxide scrubbing has occurred. In some configurations, gas from the PAPR is routed through a PAPR inlet tube 330 to the cooler 328 and over its fins to dissipate heat.

An oxygen bottle 106 is coupled to the system 100 by the oxygen bottle valve 332. An oxygen bottle regulator 334 controls flow of oxygen from the oxygen bottle 106 into the system 100. A sensor suite 336 is in the upper left-hand corner of the case 102. The sensor suite 336 housing houses a check valve and senses a number of parameters of the gas flowing from the system 100 into the mask 112.

Figure 4:
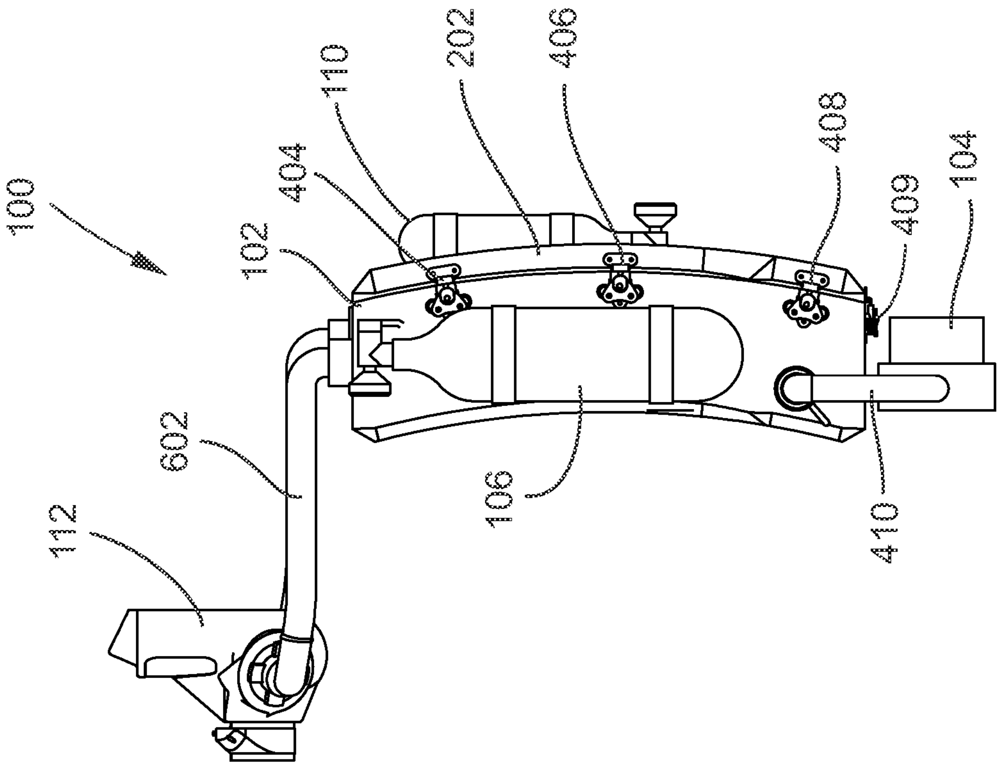
FIG. 4 illustrates the system of FIG. 1 from a side.

FIG. 4 illustrates a side view of the system 100. A number of low-profile latches 404, 406, 408, and 409 latch the lid 202 down to the case 102 and is configured to form an air-tight seal when the lid 202 is latched to the case 102. The PAPR 104 is coupled with the system 100 via the PAPR hose 410.

Figure 5:
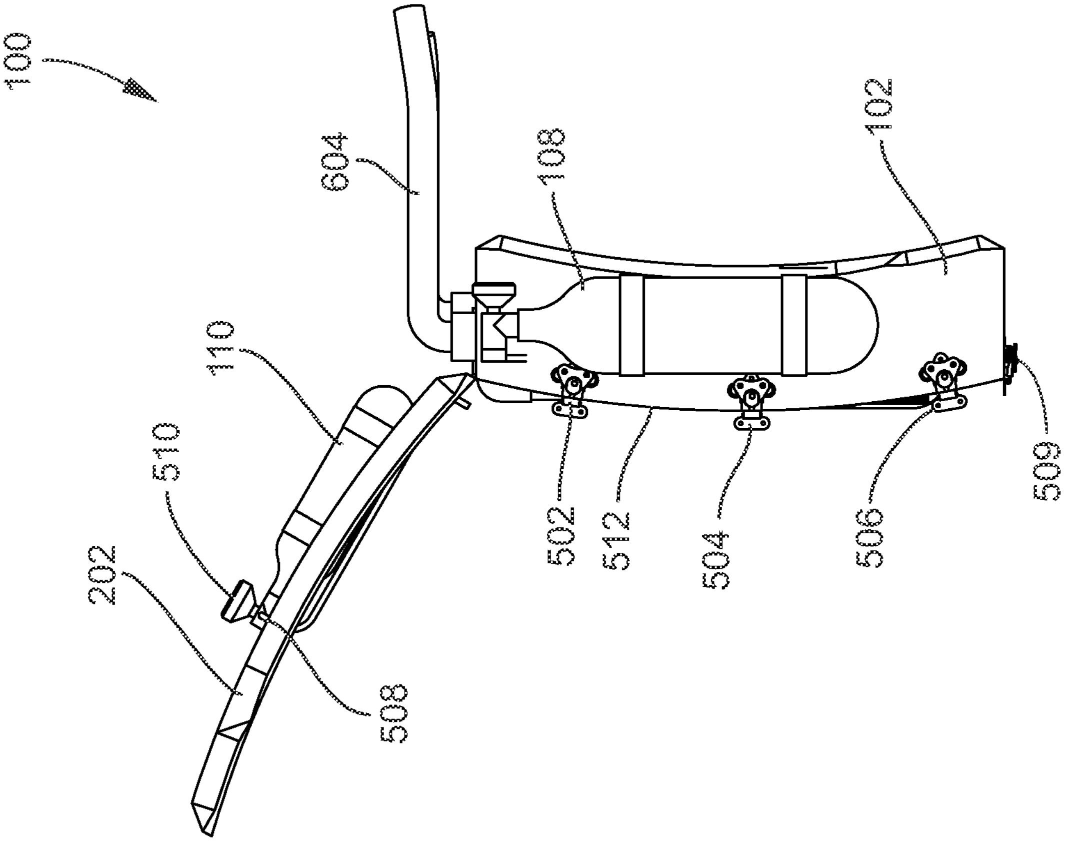
FIG. 5 illustrates the system of FIG. 1 from a side in an open configuration.

Referring to FIG. 5, the other side of the case 102 is shown, with the lid 202 open. The carbon dioxide bottle 110 is coupled to the system 100 via the carbon dioxide valve 508, and the inflow of carbon dioxide is controlled by the carbon dioxide bottle regulator 510. The case 102 has a number of low-profile latches 502, 504, 506, and 507. These latches work in conjunction with latches 404, 406, 408, and 409 to latch the lid 202 to the case 102 and via the case seal 512 forms an air-tight seal when the lid 202 is latched.

Figure 6:
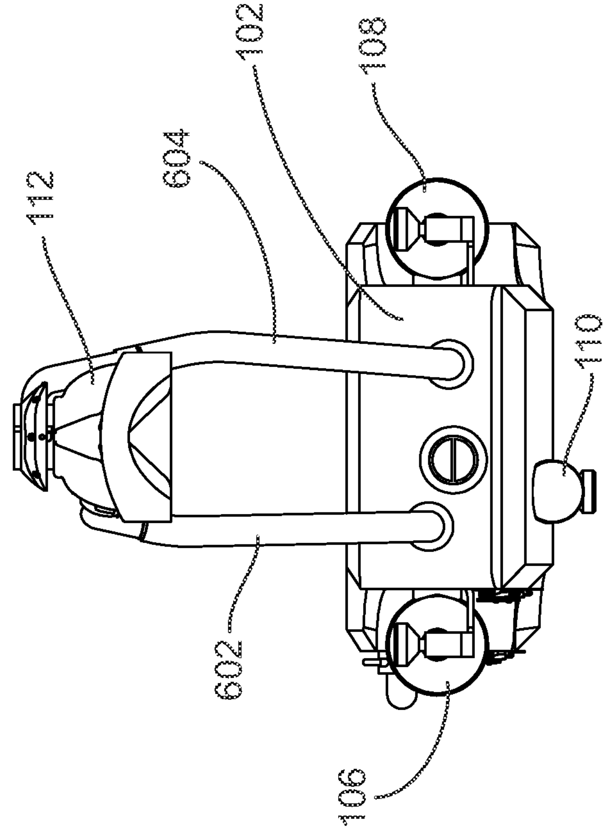
FIG. 6 illustrates the system of FIG. 1 from overhead.

FIG. 6 shows an overhead view of the system 100. The system is coupled with the mask 112 via inhalation hose 602 and exhalation hose 604.

Figure 7:
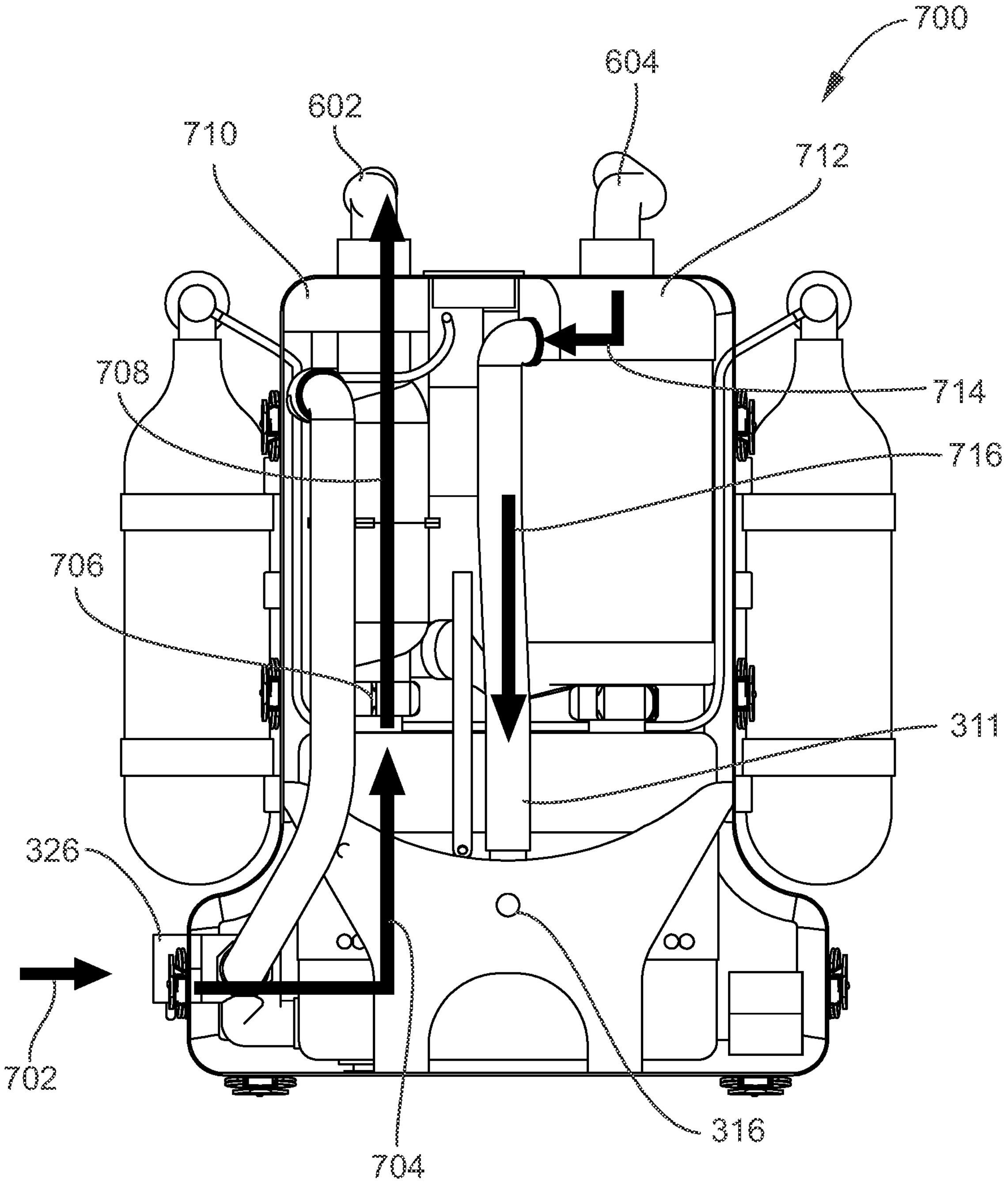
FIG. 7 illustrates the system of FIG. 1 in PAPR mode showing breathing gas circulation path.

In FIG. 7, breathing gas circulation when the system 700 is operating in the PAPR mode is shown. In this operating mode, the barrel valve 326 is open and allows PAPR air into the breathing bag 318 in the direction of arrow 702. The PAPR air inflates the breathing bag 318 to trigger the OPV 316. The PAPR gas exits the breathing bag 318 through the cooler and on to the mask, passing through check valves 706 and 710 as illustrated by arrows 704 and 708. As illustrated by arrow 714, exhaled gas returns to the system through exhalation hose 604 through check valve 712. The exhaled gas bypasses canisters (and therefore bypasses carbon dioxide scrubbing) and moves downward through the OPV tube 311 as illustrated by arrow 716. An over pressurization valve (OPV) 316 expels gas to the interior of the case 102, thereby creating a positive pressure.

Figure 8:
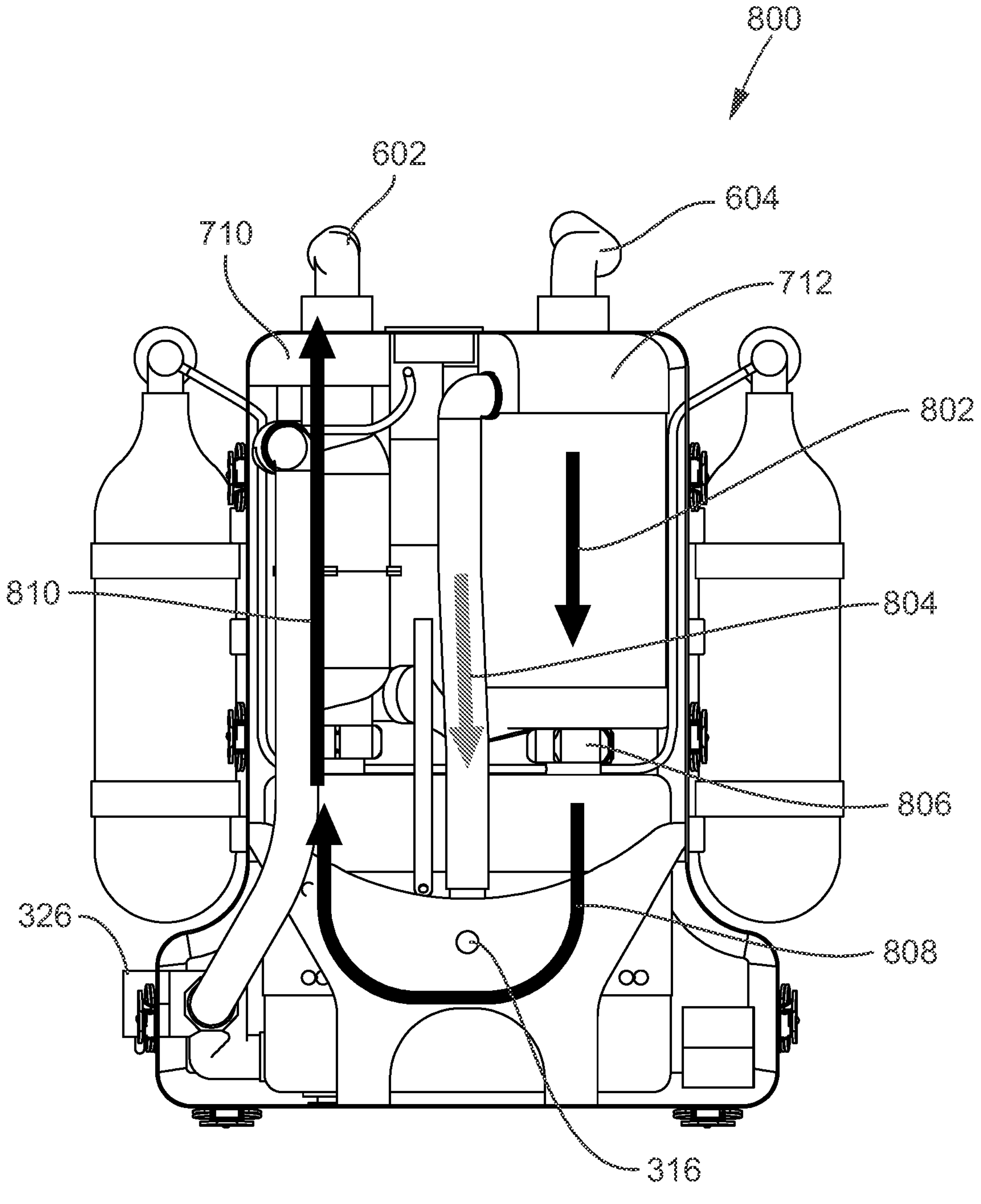
FIG. 8 illustrates the system of FIG. 1 in closed-circuit mode showing breathing gas circulation path.

In FIG. 8, breathing gas circulation when the system 800 is operating in a closed-circuit mode is shown. As illustrated by arrow 802, the exhaled gas enters the case through exhalation hose 604, check valve 712 and passes through canisters, which include carbon dioxide scrubbing material. When the gas has passed through the canisters, it passes through check valve 806 and enters the breathing bag 318 having been scrubbed of carbon dioxide. Oxygen is added to enrich the mixture from the oxygen bottle and oxygen bottle regulator. Also, diluent is added to make up volume from the diluent bottle and diluent bottle regulator. The enriched gas flow then exits the breathing bag in the direction of arrow 808, moving through a cooler in the direction of arrow 810 and on to the mask through inhalation hose 602 for rebreathing.

Also, over-pressured exhaled gas bypasses the canisters through the OPV tube as illustrated by arrow 804. At the lower end of the OPV tube, the over pressurized valve (OPV) enables gas to expel into the interior of the case, thereby creating a positive pressure in the case. The positive pressure within the system provides for ease in cleaning the system because it remains clean.

Figure 9:
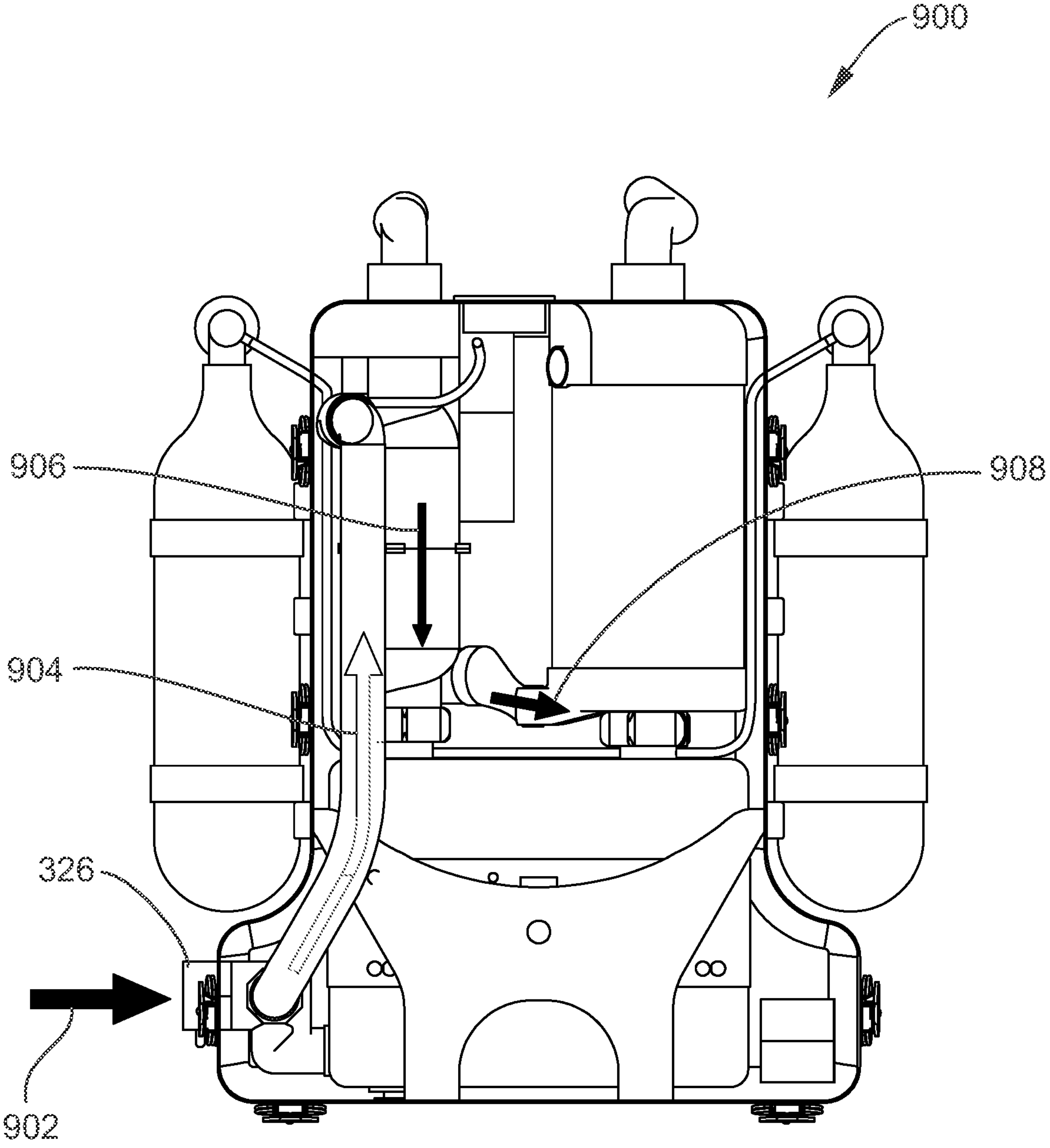
FIG. 9 illustrates the system of FIG. 1 in closed-circuit mode showing PAPR cooling gas circulation path.

In FIG. 9, the device 900 with PAPR air circulation while breathing in closed-circuit mode is shown. The PAPR air enters in the direction of arrow 902 through the barrel valve 326, which is closed, thereby allowing the PAPR air to flow in the direction of arrow 904 and then travels through the cooler as illustrated by arrow 906. The cooler has a plurality of heatsink fins, and the PAPR air flows through and cools the heatsink fins, thereby cooling the air flowing from the scrubbed (and therefore heated), enriched air flowing through the closed circuit breathing system. In some embodiments, the PAPR air, upon flowing through the cooler passes below the canister for secondary cooling of the air flowing through the canister as shown by arrow 908.

Figure 10:
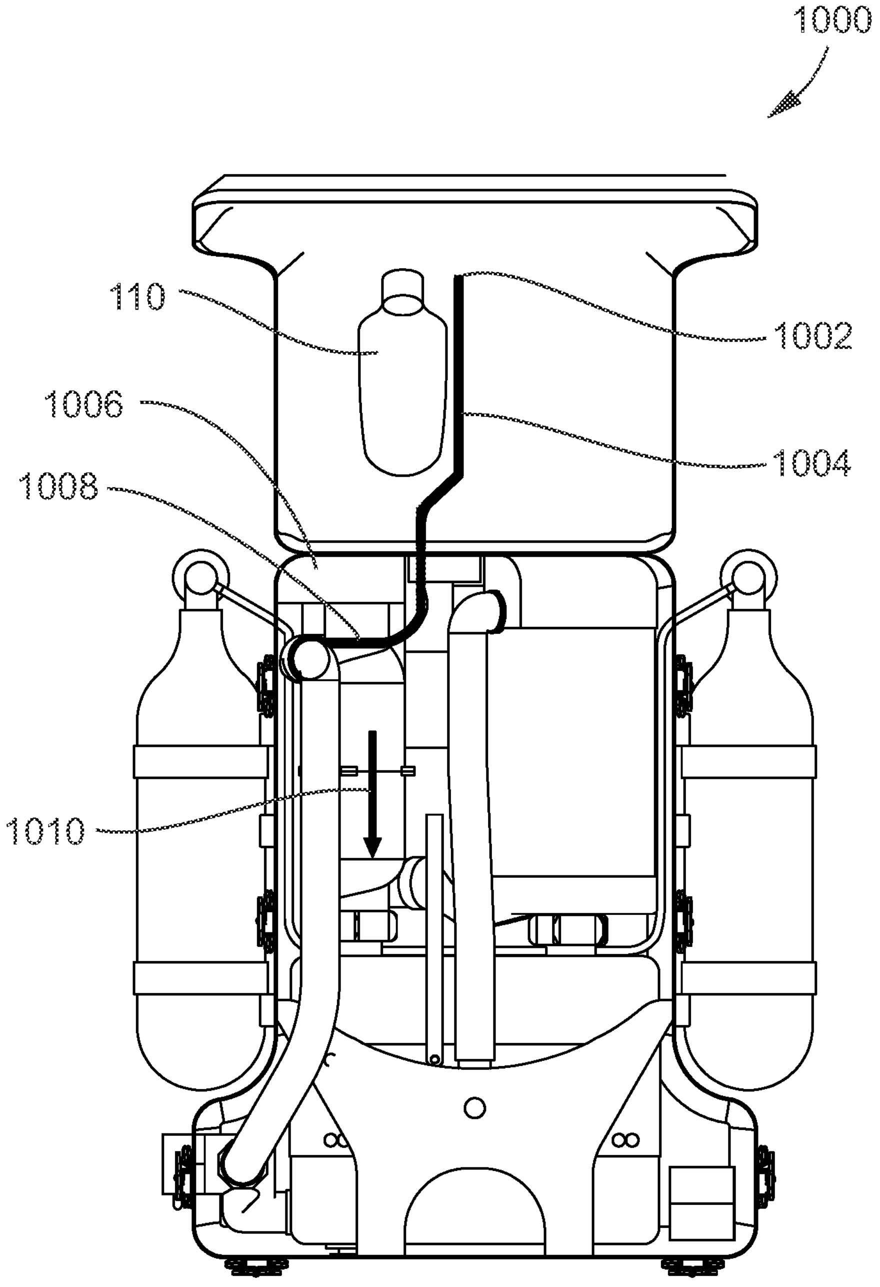
FIG. 10 illustrates the system of FIG. 1 in closed-circuit mode showing carbon dioxide gas cooling circulation path.

Referring to FIG. 10, the system's 1000 carbon dioxide cooling process is shown. A carbon dioxide bottle 110 is mounted to the exterior of the system 800. Carbon dioxide flows into a carbon dioxide inlet 1002 of a carbon dioxide line 1004. A carbon dioxide electronic controller 1006 controls the amount of carbon dioxide flowing into the cooler in the direction of arrow 1010 cooling the fins. The carbon dioxide cools the heatsink fins while combining with the PAPR air flowing through the cooler to cool the heatsink fins.

Figure 11:
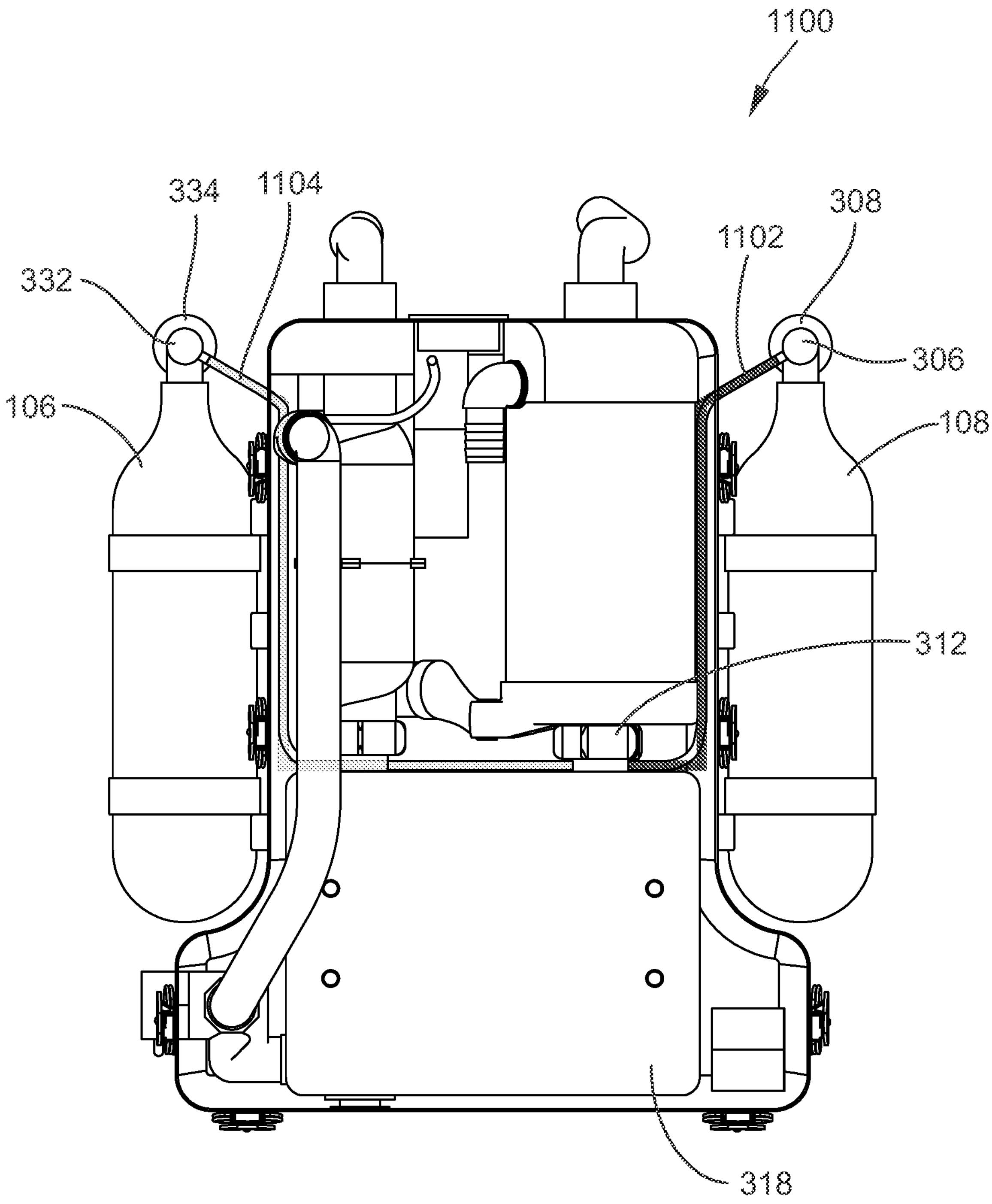
FIG. 11 illustrates the system of FIG. 1 in closed-circuit mode showing oxygen and diluent gas mixing.
Figure 12D:
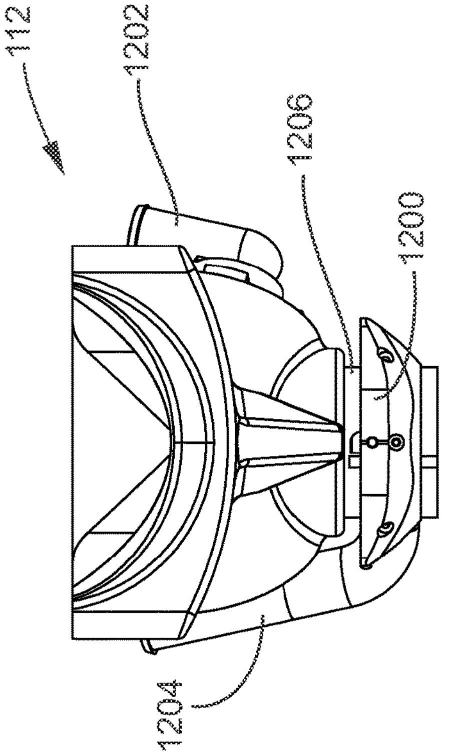
FIGS. 12A, 12B, 12C, and 12D illustrate the a mask of the system of FIG. 1 in front, side, side, and overhead views respectively.
Figure 12C:
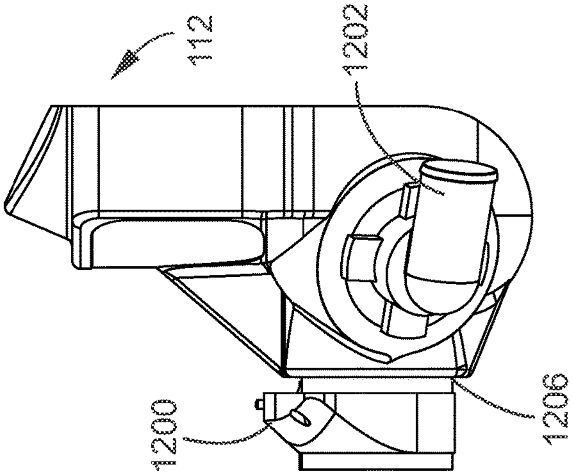
Figure 12A:
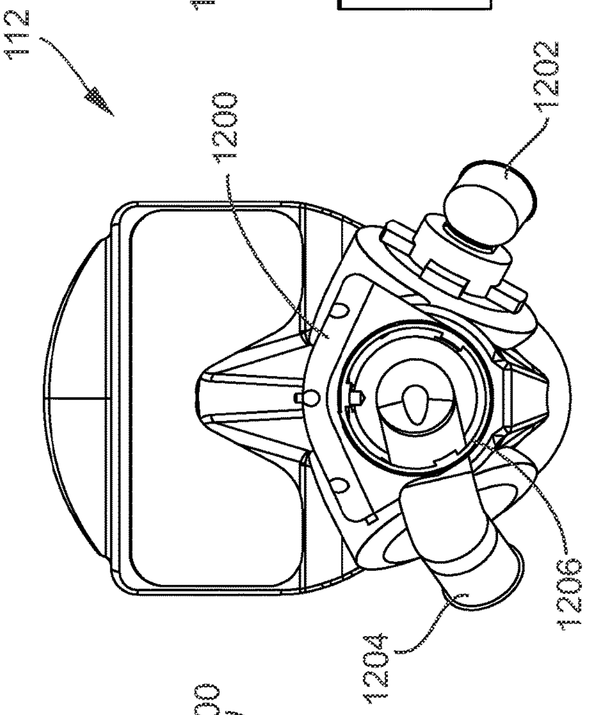
Figure 12B:
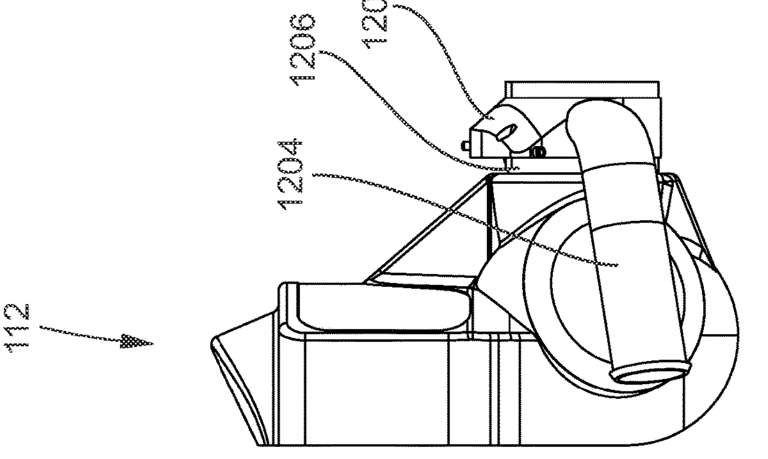
Figure 13A:
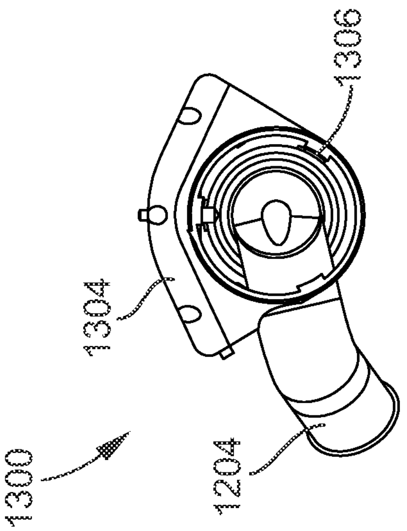
FIGS. 13A, 13B, 13C, 13D, and 13E illustrate the heads-up display of the mask of the system of FIG. 1 in front, side, side, overhead, rear, and display views respectively.
Figure 13B:
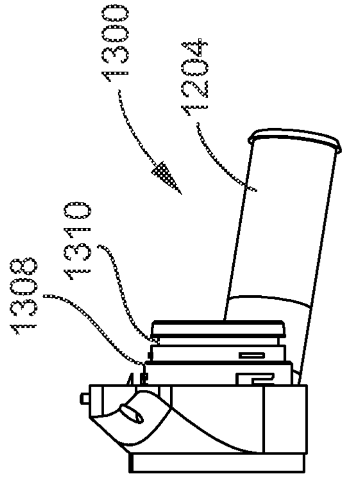
Figure 13C:
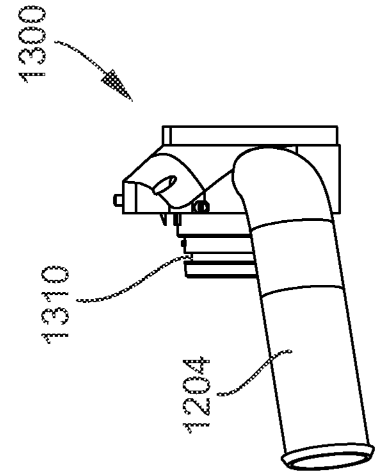
Figure 13F:
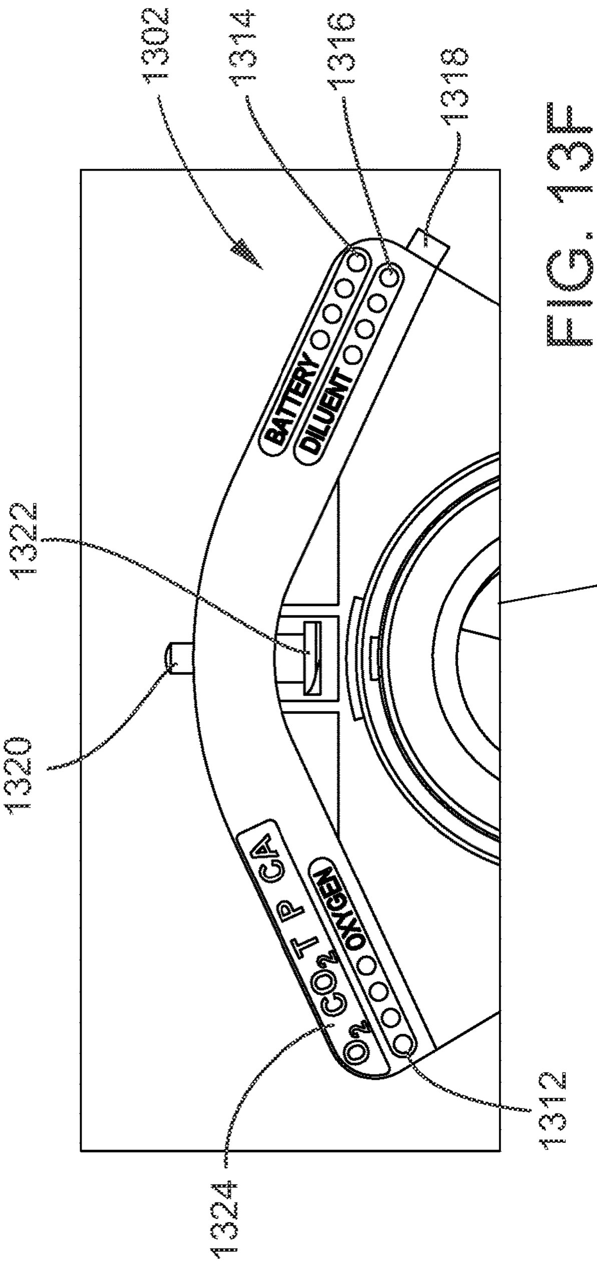
Figure 13E:
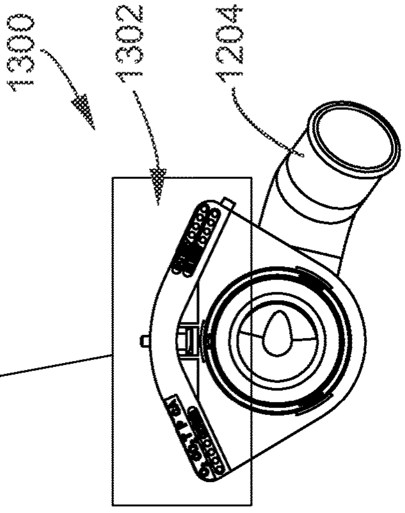
Figure 13D:
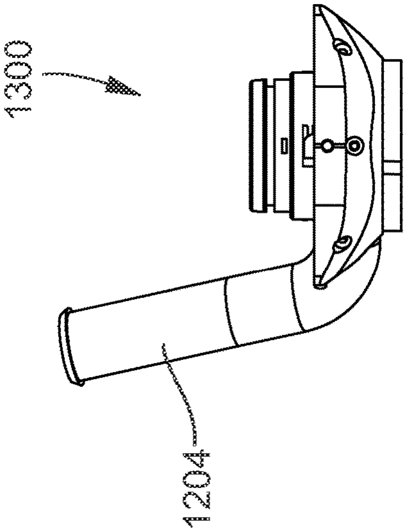

Referring to FIG. 11, an oxygen bottle 106, oxygen bottle valve 332 and oxygen bottle regulator 334 are shown on the left-hand side of the figure. A diluent bottle 108, diluent bottle valve 306 and diluent bottle regulator 308 are shown on the right-hand side of the figure. The oxygen supply line 1104 and the diluent supply line 1102 are connected to the output of the scrubbing canister down line from check valve 312 and at the input of breathing bag 318 for oxygen and diluent infusion of the scrubbed gas.

FIGS. 12A, 12B, 12C, and 12D illustrate front, side, side, and overhead views of the mask 112 of the system 100. An inhalation port 1202 couples with the inhalation hose. An exhalation port 1204 couples with the exhalation hose. A heads-up display 1200 provides information regarding operation of the system 100 to the user. A connection point 1206 is the point at which the mask 112 and the heads-up display 1200 couple with one another.

FIGS. 13A, 13B, 13C, 13D, and 13E illustrate front, side, side, overhead, rear, and display views respectively of the heads-up display 1300. The heads-up display 1300 has a removable electronics board 1304 for controlling the heads-up display 1300. The exhalation port 1204 is part of the heads-up display 1300 pod. A connection port 1306 for connecting a speaker is provided. For coupling the heads-up display 1300 with the system 100, a bayonet style profile 1308 is engaged via twist to lock and has an o-ring seal 1310 for creating an air-tight seal with the mask 112. A pod release button 1320 when depressed activates the pod release latch 1322, enabling the user to twist the heads-up display 1300 pod to detach it from the mask 112. The heads-up display 1300 has a cable entry port 1318 for coupling with a cable. An oxygen indicator 1312, a battery indicator 1314, and a diluent indicator 1316 provide visual indication of the respective levels of each resource remaining in the system 100. Indicator bank 1324 includes oxygen, carbon dioxide, temperature, pressure, and contaminated air illuminating indicators for indicating activation of different functionalities of the system 100.

Figure 14A:
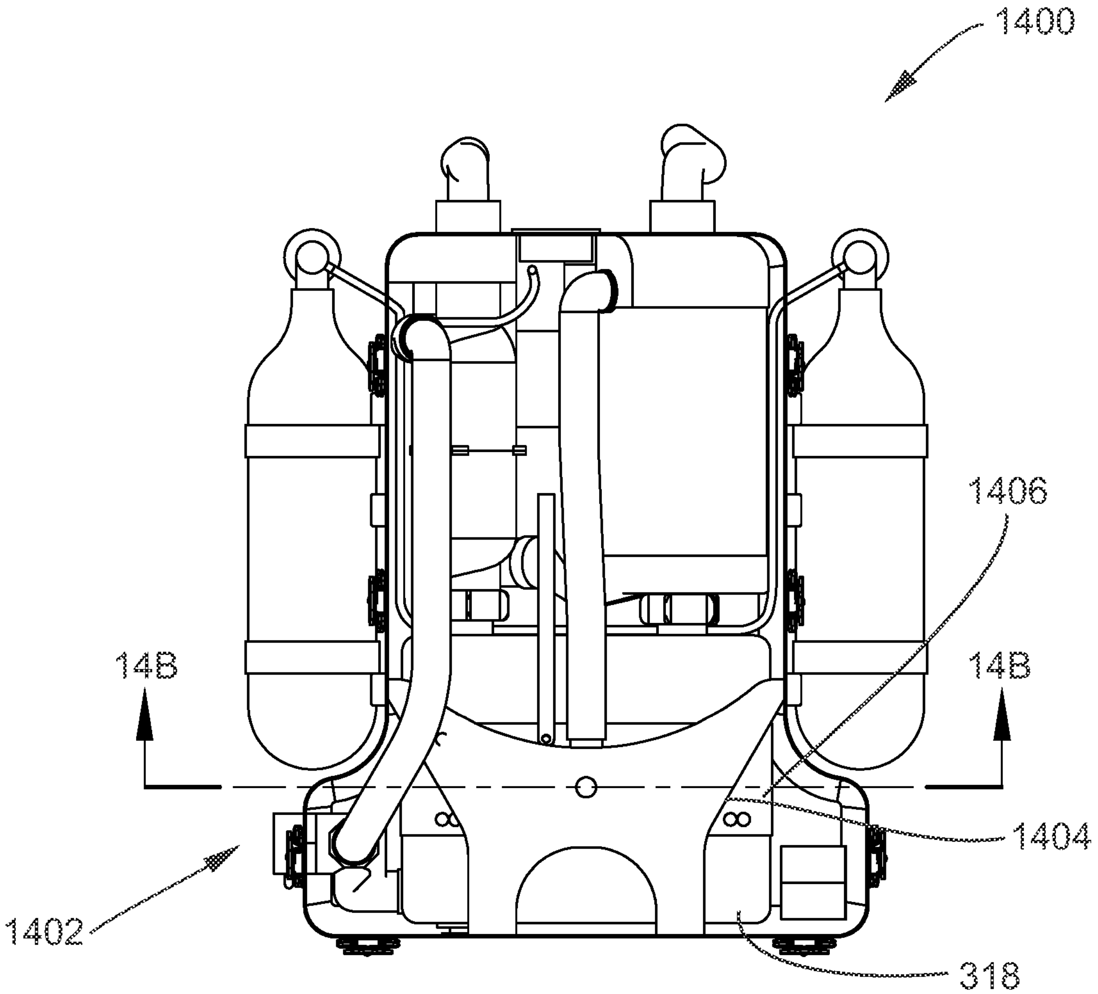
FIGS. 14A and 14B illustrate the breathing bag stabilization assembly of the system of FIG. 1.
Figure 14B:
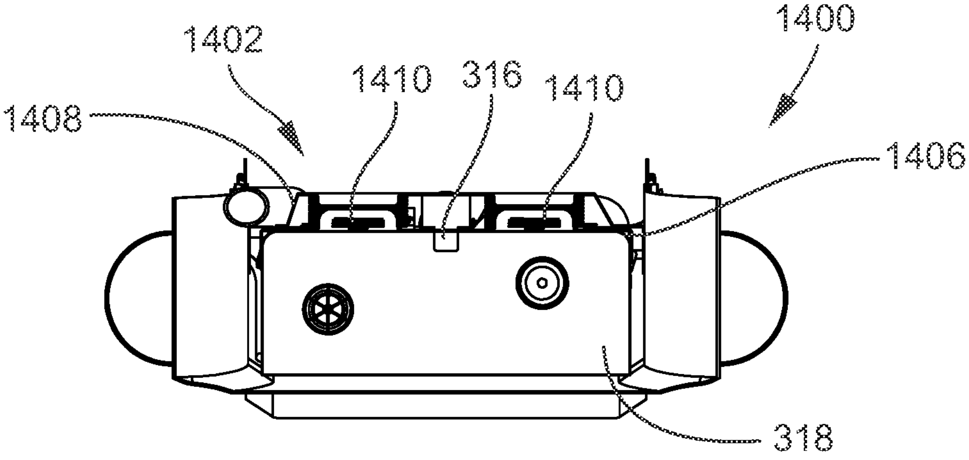

Referring to FIGS. 14A and 14B, a breathing bag stabilization assembly 1402 of the system 100 is shown. A breathing bag protective assembly 1404 has a breathing bag spring board platform 1406 that houses a plurality of bag springs 1410 which press on the breathing bag 318 to maintain a constant positive pressure, thereby ensuring that the system remains clean even as the system is manipulated, cleaned, prepped, or torn-down. The breathing bag as shown is inflated.

Figure 15:
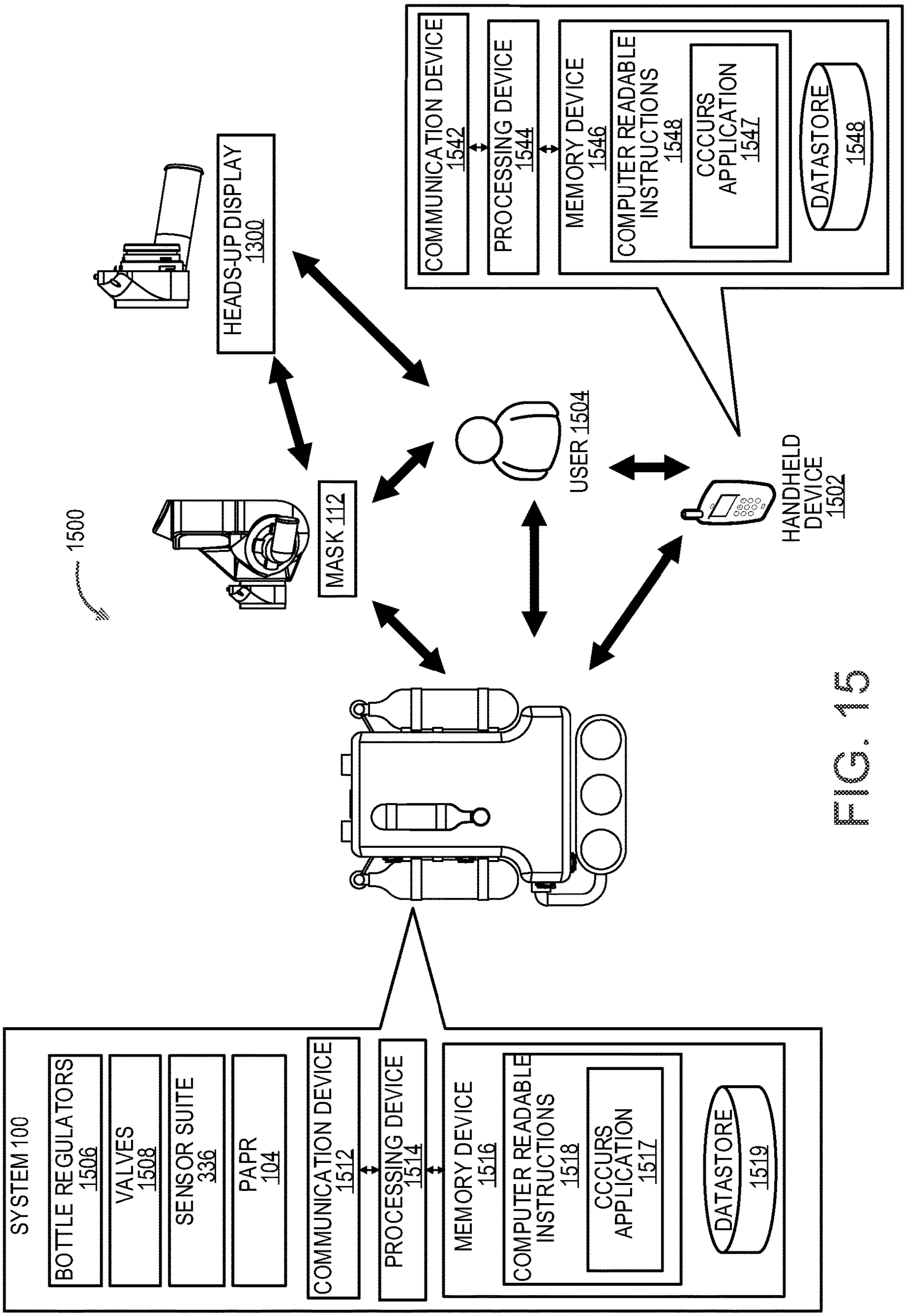
FIG. 15 illustrates the system of FIG. 1 interacting with a user.

Referring to FIG. 15, a CCCUR system 100 according to embodiments of the present disclosure is shown interacting with an operator or user 1504. As discussed herein, the system 100 is used by the user in an environment where normal breathing is inhibited by a contaminating condition. An uncontaminated site is called a "cold zone," and a user dresses in the user's special equipment while in the cold zone. First, the user confirms sufficiently filled bottles of oxygen, carbon dioxide, and diluent (if applicable) are coupled with the system. The user then dons the gear of the system 100, including placing the case of the system 100 on the user's back for carrying. The user also connects a handheld device 1502 with the system 100 via cable or other hard-wired connection. In other embodiments, the handheld device 1502 communicates with the system 100 via wireless protocol such as Bluetooth or other protocol. Then, the user powers-on the CCCUR system 100, which typically initiates in a PAPR mode. The user then finishes masking-up or placing the mask 112 on the user's face, followed by ensuring coupling of the heads-up display 1300 with the mask 112. The mask 112 and heads-up display 1300 are coupled with the other components of the system through inhalation and exhalation hoses as discussed above. The heads-up display is hard-wired to or wirelessly coupled with the system 100 and/or the handheld device 1502 for receiving information about the operation of the system and/or signals for powering the appropriate indicators in the heads-up display 1300. The user ensures a tight seal with the hood. Once the equipment is powered-on and the user has connected the handheld device 1502, the user shifts to closed circuit mode by selecting closed circuit mode on the handheld device 1502. The user then can enter the warm or hot zone wherein the contaminated environment exists and go to work.

As shown in FIG. 15, the system 100 generally includes a number of electronic breathing system components such as bottle regulators 1506, valves 1508, the sensor suite 336, and the PAPR 104. Each of these components, which functions are described elsewhere herein, are operatively coupled with the processing device 1514 of the system 100. The processing device is also operatively coupled with the communication device 1512 and the memory device 1514.

As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 1514 is operatively coupled to the communication device 1512 and the memory device 1516. The processing device 1514 may use the communication device 1512 to communicate with the handheld device 1502, the heads-up display 1300 and in some cases other devices external to the system. As such, the communication device 1512 generally comprises a modem, server, wireless communication circuitry or other device for communicating with other external devices. The handheld device 1502 may include, for example, a handheld input/output device such as, for example, a Shearwater Petrel 2 Fischer handheld device. The handheld device may be or include other similar devices whether or not the devices are mentioned within this specification.

The memory device 1516 may include computer-readable instructions 1518 stored in the memory device 1516, which in one embodiment includes the computer-readable instructions 1518 of a CCCURS application 1517 (e.g., instructions for controlling bottle regulators, valves, sensor suite, PAPR and other components of the system in accordance with this disclosure) for execution by the processing device 1514. In some embodiments, the memory device 1516 includes a datastore 1519 for storing data related to the system 100, including but not limited to data created and/or used by CCCURS application 1517.

The handheld device 1502 has a processing device 1544 that is operatively coupled to the communication device 1542 and the memory device 1546. The processing device 1544 may use the communication device 1542 to communicate with the system 100, the heads-up display 1300 and in some cases other devices external to the handheld device 1502. As such, the communication device 1542 generally comprises a modem, server, wireless communication circuitry or other device for communicating with other external devices. The handheld device 1542 also includes a display (not shown) and input/output components (not shown) such as a keyboard, buttons, touchscreen, or other input/output components. The handheld device 1502 may be, for example, a handheld input/output device such as, for example, a Shearwater Petrel 2 Fischer handheld device. The handheld device may be or include other similar devices whether or not the devices are mentioned within this specification.

The memory device 1546 may include computer-readable instructions 1548 stored in the memory device 1546, which in one embodiment includes the computer-readable instructions 1548 of a CCCURS application 1547 (e.g., switching among modes of operation of the system 100, and, in some cases, instructions for controlling bottle regulators, valves, sensor suite, PAPR and other components of the system in accordance with this disclosure) for execution by the processing device 1544. In some embodiments, the memory device 1546 includes a datastore 1548 for storing data related to the handheld device 1502 and/or the system 100, including but not limited to data created and/or used by the CCCURS application 1547. In some embodiments, the CCCURS application 1517 and the CCCURS application 1547 are the same and in some embodiments they are different.

As described herein, a closed-circuit combined unit respirator system has been described with reference to specific embodiments and examples. Various details of the present disclosure may be changed without departing from the scope of the present disclosure. Furthermore, the foregoing description of the preferred embodiments of the present disclosure and best mode for practicing the present disclosure are provided for the purpose of illustration only and not for the purpose of limitation, the present disclosure being defined by the claims.

It is understood that the systems and devices described herein illustrate one embodiment of the present disclosure. It is further understood that one or more of the systems, devices, or the like can be combined or separated in other embodiments and still function in the same or similar way as the embodiments described herein.

While certain exemplary embodiments have been described and shown in the accompanying drawings, it is to be understood that such embodiments are merely illustrative of, and not restrictive on, the broad present disclosure, and that this present disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the present disclosure. Therefore, it is to be understood that, within the scope of the appended claims, the present disclosure may be practiced other than as specifically described in this application.

We claim:

1. A system for closed-circuit combined respiration, comprising:

a closed-circuit breathing apparatus housed within a sealed case, the closed-circuit breathing apparatus configured to selectively operate in a closed-circuit mode of the system; and a powered air purifying respirator (PAPR) in fluid communication with the closed-circuit breathing apparatus, the PAPR configured to selectively operate in a PAPR mode of the system;

wherein the PAPR configured to intake and filter external air, and the PAPR being fluidly coupled to the sealed case; and a mode-selective flow control valve disposed between the PAPR and the sealed case, wherein in the PAPR mode, the mode-selective flow control valve permits filtered external air produced by the PAPR to enter for powered ambient air respiration, and at least a portion of exhaled gas is expelled into an interior volume of the sealed case to create positive case pressure; and wherein in the closed circuit mode, the mode selective flow control valve blocks filtered external air from entering, and breathing gas is recirculated for closed circuit enriched air respiration.

2. The system of claim 1, wherein the closed-circuit breathing apparatus includes:

a carbon dioxide scrubber configured to receive an exhaled gas and scrub carbon dioxide from the exhaled gas;

a breathing bag in fluid communication with the carbon dioxide scrubber, the breathing bag configured to receive the scrubbed gas; and an oxygen system configured to infuse the scrubbed gas with oxygen, resulting in an enriched gas.

3. The system of claim 2, wherein the carbon dioxide scrubber is a carbon dioxide scrubbing canister.

4. The system of claim 2, wherein the closed-circuit breathing apparatus further includes a breathing hose configured to transmit the enriched gas for inhalation.

5. The system of claim 2, wherein the closed-circuit breathing apparatus further includes a cooler configured to cool the enriched gas, wherein the cooler is disposed downstream of the breathing bag.

6. The system of claim 5, wherein the cooler comprises a plurality of heatsink fins.

7. The system of claim 2, further comprising a tube configured to receive the exhaled gas and cause at least a portion of the exhaled gas to bypass the carbon dioxide scrubber when the system is operating in the PAPR mode.

8. The system of claim 2, wherein the PAPR is fluidly connected to the breathing bag of the closed-circuit breathing apparatus.

9. The system of claim 8, wherein the PAPR includes the valve configured to selectively permit the filtered external air to flow into the breathing bag when the system is operating in the PAPR mode.

10. The system of claim 8, wherein a cooler and a breathing hose of the closed-circuit breathing apparatus is configured to receive and transmit the filtered external air from the breathing bag for inhalation when the system is operating in the PAPR mode.

11. The system of claim 1, further comprising an over-pressure valve (OPV) configured to expel at least a portion of the exhaled gas into an interior of a case, thereby creating positive pressure therein, when the system is operating in the PAPR mode.

12. The system of claim 1, wherein PAPR is configured to intake and filter external air for allowing filtered external air to flow into a breathing bag when in the PAPR mode.

13. The system of claim 12, wherein the PAPR is in fluid communication with a cooler of the closed-circuit breathing apparatus via a PAPR cooling tube, wherein the PAPR cooling tube is configured to transmit at least a portion of the filtered external air to the cooler for a cooling thereof when the system is operating in the closed-circuit mode.

14. The system of claim 12, wherein a carbon dioxide bottle and a controller of the closed-circuit breathing apparatus are configured to infuse the filtered external air with carbon dioxide for cooling a cooler of the closed-circuit breathing apparatus when the system is operating in the closed-circuit mode.

15. A system for closed-circuit combined respiration, comprising: a closed-circuit breathing apparatus housed within a sealed case, the closed-circuit breathing apparatus configured to selectively operate in a closed-circuit mode of the system; and a powered air purifying respirator (PAPR) in fluid communication with the closed-circuit breathing apparatus, the PAPR configured to selectively operate in a PAPR mode of the system;

a carbon dioxide scrubbing canister configured to receive an exhaled gas and scrub carbon dioxide from the exhaled gas when the system is operating in the closed-circuit mode;

an oxygen bottle, an oxygen bottle valve, and an oxygen bottle regulator configured to infuse the scrubbed gas with oxygen, resulting in an enriched gas when the system is operating in the closed-circuit mode;

a cooler comprising a plurality of heatsink fins configured to cool the enriched gas when in the closed-circuit mode, a breathing hose configured to transmit the enriched gas for inhalation when the system is operating in the closed-circuit mode;

wherein the PAPR is configured to intake and filter external air;

a mode-selective flow control valve disposed between the PAPR and the sealed case, wherein in the PAPR mode, the mode-selective flow control valve permits filtered external air produced by the PAPR to enter for powered ambient air respiration, and at least a portion of exhaled gas is expelled into an interior volume of the sealed case to create positive case pressure; and wherein in the closed circuit mode, the mode selective flow control valve blocks filtered external air from entering, and breathing gas is recirculated for closed circuit enriched air respiration; and wherein on demand switching is permitted between powered ambient air respiration and closed circuit enriched air respiration without removing the apparatus from the user.

16. The system of claim 15, further comprising a breathing bag configured to receive the scrubbed gas when in the closed-circuit mode, wherein the cooler is disposed downstream of the breathing bag; and a diluent bottle, a diluent bottle valve, and a diluent bottle regulator for infusing at least one of the exhaled gas, the scrubbed gas, and the enriched gas with a diluent when the system is operating in the closed-circuit mode.

17. The system of claim 16, further comprising:

a tube configured to receive the exhaled gas and cause at least a portion of the exhaled gas to bypass the canister when the system is operating in the PAPR mode;

an over-pressure valve (OPV) configured to expel at least the portion of the exhaled gas into the interior of the case, thereby creating positive pressure when the system is operating in the PAPR mode;

and wherein the PAPR is configured to intake and filter external air while a barrel valve is open, thereby allowing the filtered external air to flow into the breathing bag when in the PAPR mode, wherein the cooler is configured to receive the filtered external air from the breathing bag and transmit the filtered external air to the breathing hose for inhalation when the system is operating in the PAPR mode; and wherein the mode-selective flow control valve is the barrel valve.

18. The system of claim 15, further comprising a PAPR cooling tube configured to transmit at least a portion of the filtered external air to the cooler for cooling the heatsink fins when the system is operating in the closed-circuit mode.

19. The system of claim 15, further comprising a carbon dioxide bottle and a controller configured to infuse the filtered external air with carbon dioxide for cooling the heatsink fins when the system is operating in the closed-circuit mode.

20. A system for closed-circuit combined respiration, comprising:

a closed-circuit breathing apparatus housed within a sealed case, the closed-circuit breathing apparatus configured to selectively operate in a closed-circuit mode of the system; the case configured to further house a breathing bag;

a carbon dioxide scrubbing canister configured to receive exhaled gas and scrub carbon dioxide from the exhaled gas when the system is operating in the closed-circuit mode, wherein the breathing bag is configured to receive the scrubbed gas when the system is operating in the closed-circuit mode;

an oxygen bottle, an oxygen bottle valve, and an oxygen bottle regulator configured to infuse at least one of the exhaled gas and the scrubbed gas with oxygen resulting in enriched gas when the system is operating in the closed-circuit mode;

a cooler comprising a plurality of heatsink fins configured to cool the enriched gas when the system is operating in the closed-circuit mode;

a breathing hose configured to transmit the enriched gas for inhalation when the system is operating in the closed-circuit mode;

a tube configured to receive the exhaled gas and cause at least a portion of the exhaled gas to bypass the canister when in a powered air purifying respirator (PAPR) mode;

an over-pressure valve (OPV) configured to expel at least the portion of the exhaled gas into an interior of the case, thereby creating positive pressure within the case when in the PAPR mode;

a barrel valve for the PAPR to selectively control intake and filtering of external air while the barrel valve is open, thereby allowing the filtered external air to flow into the breathing bag when in the PAPR mode, wherein the cooler is configured to receive the filtered external air from the breathing bag and transmit the filtered external air to the breathing hose for inhalation when the system is operating in the PAPR mode;

wherein PAPR is configured to intake and filter external air; and the barrel valve is disposed between the PAPR and the sealed case;

wherein in the PAPR mode, the barrel valve permits filtered external air produced by the PAPR to enter for powered ambient air respiration, wherein in the closed circuit mode, the barrel valve blocks filtered external air from entering, and breathing gas is recirculated for closed circuit enriched air respiration; and wherein on demand switching is permitted between powered ambient air respiration and closed circuit enriched air respiration without removing the apparatus from the user.

* * * * *